United States Patent
McClenan

[15] 3,649,054
[45] Mar. 14, 1972

[54] CABLE FITTING FOR SHIP BULKHEADS

[72] Inventor: Warren G. McClenan, 831 South Main Street, Burbank, Calif. 91506

[22] Filed: Dec. 3, 1970

[21] Appl. No.: 94,851

[52] U.S. Cl. ............................................. 285/158, 287/20
[51] Int. Cl. ......................................................... F16l 5/00
[58] Field of Search ............ 285/158, 348, 343; 287/20

[56] References Cited

UNITED STATES PATENTS

| | | | |
|---|---|---|---|
| 2,431,154 | 11/1947 | Wikstrom | 285/158 |
| 2,250,517 | 7/1941 | Zolleis | 285/343 X |
| 1,956,683 | 5/1934 | Hewitt | 285/158 X |
| 3,188,122 | 6/1965 | Smith | 285/348 |

Primary Examiner—Andrew V. Kundrat
Attorney—Robert C. Combstock

[57] ABSTRACT

A cable fitting for ship bulkheads which can be installed after the cable is already in place and testing of the cable connections completed. All parts of the fitting are split diametrically and fitted around the cable from the outside. A housing has a base which is secured to the bulkhead. The cable extends through adjacent circular and frustoconical openings in the housings. A frustoconical compression gland is mounted in the frustoconical opening in the housing. A nut is tightened on the housing to compress the gland inwardly into engagement with the cable. A loosely mounted washer in the nut prevents twisting of the gland. Sealing means are provided in all portions of the fitting.

6 Claims, 7 Drawing Figures

Patented March 14, 1972 3,649,054
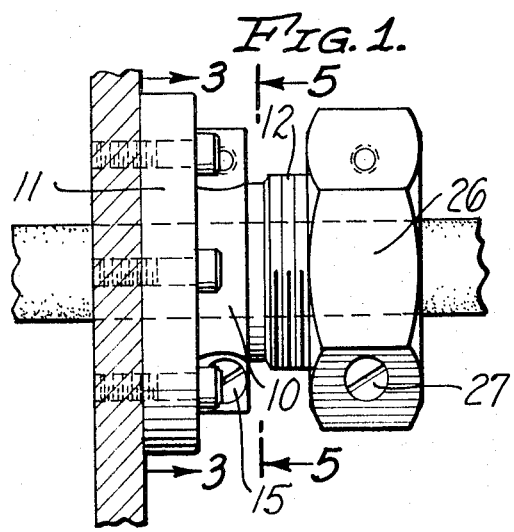
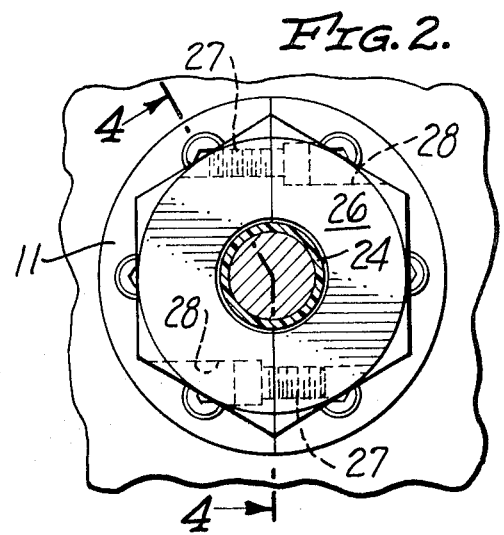
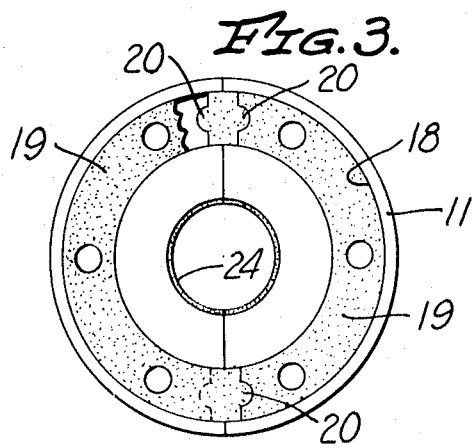
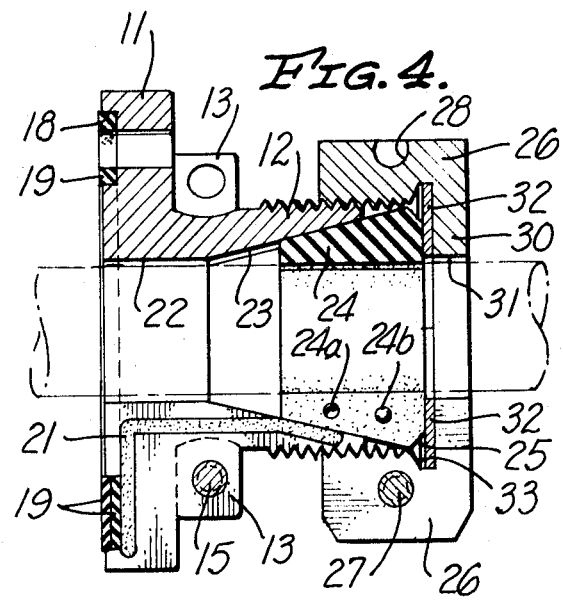
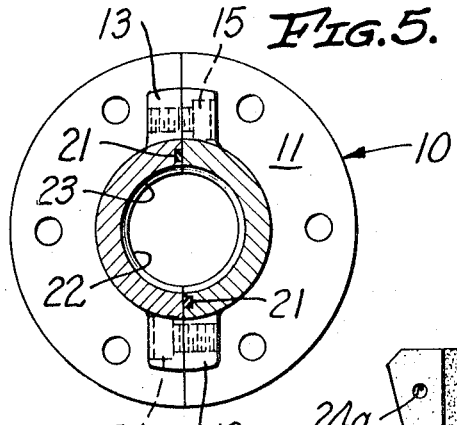
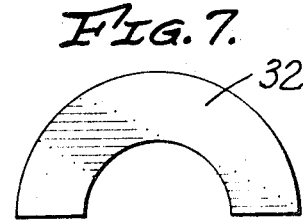
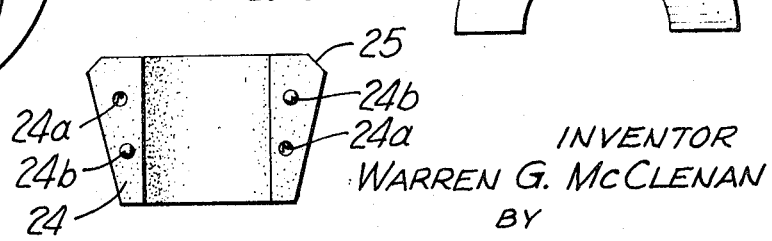
INVENTOR
WARREN G. McCLENAN
BY
ROBERT C. COMSTOCK
ATTORNEY

CABLE FITTING FOR SHIP BULKHEADS

BACKGROUND OF THE INVENTION

1. Field of the Invention

A cable fitting for ship bulkheads and the like which is capable of installation after the cable is already in place in the ship.

2. Description of the Prior Art

At the present time, the ship is assembled in a conventional manner and all of the electrical cables are installed in the ship after the bulkheads are in place. It is accordingly necessary first to take a torch into the hold of a ship and cut the necessary cable openings in the bulkheads. The packing or stuffing tube is then welded into each of the cable openings for the purpose of supporting the cable. The cable is then run through the tubes.

It is then necessary to terminate or connect the electrical wiring within the hold of the ship. After this has been done, testing equipment is taken into the hold of the ship to test the circuits and make certain that all of the cable connections have been correctly made.

All of this is time consuming and costly because the entire cable installing and testing operation is performed within the hold of the ship.

SUMMARY OF THE INVENTION

The invention comprises a cable fitting which is adapted to be installed after the bulkheads are in place and the cable completely installed, connected and tested.

With this invention, it is possible to cut the cable carrying openings in the bulkheads while the bulkheads are still in the shop and before they are installed in the ship. This avoids the necessity of taking torches and cutting equipment into the hold of the ship.

It is also possible to cut the cable to length, terminate and solder connections and test the circuits all in the shop before the cable is installed in the ship. This accordingly eliminates the necessity of making and testing the connections in the hold of the ship.

It is accordingly among the objects of the invention to provide a cable fitting which provides substantial economies in the installation and testing cable in a ship. Another object is to provide such a fitting having all of the advantages and benefits set forth above and described in detail hereinafter in this specification.

Another object of the invention is to provide a cable fitting in which all of the parts are diametrically split for ease, speed and economy of installation in situ on the bulkhead of a ship.

A further object of the invention is to provide such a device which is effectively sealed against leakage.

It is another object of the invention to provide such a device which is simple and economical to manufacture and assemble.

The invention also comprises such other objects, advantages and capabilities as will later more fully appear and which are inherently possessed by the invention.

While I have shown in the accompanying drawings a preferred embodiment of the invention, it should be understood that the same is susceptible of modification and change without departing from the spirit of the invention.

DESCRIPTION OF THE DRAWINGS

FIG. 1 is a side elevational view of my cable fitting for ship bulkheads in use on the bulkhead of a ship, with a cable extending through the fitting;

FIG. 2 is a front elevational view of the same;

FIG. 3 is a sectional view of the fitting taken on line 3—3 of FIG. 1, with the end of one of the split seals broken away to show the end of the split seal therebeneath;

FIG. 4 is a sectional view of the fitting taken on line 4—4 of FIG. 2, with the bulkhead and fitting fastening members omitted and the cable shown in phantom lines;

FIG. 5 is a sectional view of the fitting taken on line 5—5 of FIG. 1, with the fitting fastening members, bulkhead and cable omitted;

FIG. 6 is an elevational view of one-half of the compression gland;

FIG. 7 is an elevational view of one-half of the compression ring.

DESCRIPTION OF THE PREFERRED EMBODIMENT

A preferred embodiment which has been selected to illustrate my invention comprises a diametrically split housing 10, which is preferably formed of aluminum, although other suitable substantially rigid materials may also be used. The housing 10 is split into two identical sections. The housing 10 has a base 11 having a substantially flat lower surface. The base 11 is provided with a plurality of openings which are spaced around its periphery and which are adapted to receive suitable fastening means such as bolts or the like for the purpose of attaching the base 11 and housing 10 to a bulkhead. The base 11 is normally attached to a vertical surface.

Formed integrally with the base 11 is an externally screw-threaded projection 12, which is likewise split diametrically into two identical sections.

The base 11 has a pair of bosses 13, which are also split into two sections. A fastener receiving opening extends through each of the bosses 13. The inner diameter of one section of each of the bosses 13 is provided with internal screw threading for engaging complementary threading on one end of a fastening member 15. The other end of the fastening member 15 comprises an enlarged head. The fastening member 15 may be tightened to draw and hold the two sections of the housing 10 together.

The bottom surface of the base 11 is provided with an annular recess 18 which is adapted to removably receive a split seal 19, which is preferably formed of neoprene, although other suitable sealing or gasketing material may also be used. The seal 19 is provided with spaced openings which are adapted to be aligned with the openings in the base 11.

Both ends of both sections of the split seal 19 are reduced to half the thickness of the remainder of the seal 19. Each section is also provided with a pair of projections 20 and complementarily formed recesses which assure proper alignment and positioning of the sections of the split seal 19 with respect to each other and within the recess 18. The reduced thickness portions also overlap each other to provide added sealing to prevent any leakage from occurring between the two sections of the split seal 19.

The abutting faces along which the housing 10 are split are provided with a pair of substantially L-shaped recesses, which are adapted to receive a pair of complementarily formed seal strips 21. The seal strips 21 are preferably formed of neoprene, although other suitable sealing or gasketing material may also be used.

The face of each section of the housing 10 which abuts against the seal strip 21 of the other section is flat. The seal strips 21 are preferably very slightly thicker than the depth of the recess in which they are mounted. When the two sections of the housing 10 are secured together, the seal strips 21 provide resilient seals between the two sections on diametrically opposite sides of the housing 10.

It will be noted that one end of each of the seal strips 21 engages the outer periphery of the compression gland 24 (described hereinafter) and makes sealing engagement with the inner half of its periphery. The opposite end of each of the seal strips 21 extends across and makes sealing engagement with the split seal 19.

The center of the housing 10 is provided with a pair of openings which extend continuously therethrough. These openings comprise a circular opening 22 which is disposed substantially within the base 11 and an outwardly tapering frustoconical opening 23 which is disposed substantially within the screw-threaded portion 12.

Removably mounted within the frustoconical opening 23 is a split compression gland 24, which is preferably formed of neoprene, although other suitable packing or gasketing material may also be used. The abutting faces of the two sections of the compression gland 24 are provided with alternately spaced pins 24a and holes 24b to assure proper alignment of the sections when they are secured together. The outer edge of the compression gland 24 is provided with a bevel 25 which extends around its entire periphery.

A nut 26 is split diametrically into two sections which are drawn and held together by a pair of fastening members 27 which are mounted in diametrically oppositely disposed recesses 28. Each of the fastening members 27 has a head which engages one section of the nut and an externally screw-threaded end which engages complementarily screw threading on the inside of the recess 28 of the other section.

The inner end of the nut 26 is provided with internal screw threading which is adapted to engage the external screw-threaded portion 12 of the housing 10. The outer end of the nut 26 is provided with an end portion 30 which has a circular opening 31 which is substantially equal in diameter to the circular opening 22 in the housing 10.

Mounted directly inwardly from the end portion 30 is a cylindrical compression ring 32, which is preferably formed of aluminum, although other suitable preferably substantially rigid material may also be used. The compression ring 32 has a central opening which is equal in diameter to the opening 31.

The outer diameter of the compression ring 32 is somewhat greater than that of the internal screw threading of the nut 26. The nut 26 is provided with an annular recess 33 which is disposed between the end portion 30 and the internal screw threading. This recess 33 is adapted to receive the outer periphery of the compression ring 32. The ring 32 is accordingly held within the nut 26 when its two sections are secured together.

The thickness of the compression ring 32 is preferably slightly less than the depth of the recess 33 in which it is mounted, so that the nut 26 is free to rotate with respect to the compression ring 32.

In use, the cable openings in the bulkheads may be cut while the bulkheads are still in the shop and before they are installed in place on the ship. The cable may be cut to length and its connections terminated and tested in the shop.

After the cable has been installed in the ship, the split cable fitting may be mounted on the bulkhead around the cable. This is simple to do because all parts of the fitting are diametrically split and are simply mounted around the cable and then connected together.

It will be seen that the split seal 19 provides resilient sealing engagement between the housing 10 and the bulkhead. The compression seal strips 21 provide resilient sealing engagement between the two sections of the housing 10.

When the nut 26 is tightened on the screw-threaded portion 12 of the housing 10, the compression ring 32 exerts compressive force against the bevelled outer end of the compression gland 24. The compression ring 32 remains stationary in engagement with the compression gland 24 while the nut 26 rotates. This avoids the application of twisting or torque to the compression gland 24. The compression gland 24 is thus forced inwardly within the frustoconical opening 23, causing the inner diameter of the compression gland 24 to be reduced and moved into engagement with the outer periphery of the portion of the cable which passes through it.

In addition to facilitating and expediting the installation of the cable, the fitting of the present invention also facilitates and expedites repairs if the same are required. It was formerly necessary to remove the cable connectors and/or clamps and the packing material used around the stuffing tube before the cable could be removed. After the repairs were made, these parts were replaced. With the present invention, it is a simple matter to disconnect the fitting and remove the cable with the connectors and clamps still in place, if so desired. This is possible because the bulkhead openings are preferably made sufficiently large to accommodate these parts. It is equally simple to replace the cable and fitting after the repairs have been made.

I claim:

1. A cable fitting for the bulkhead of a ship or the like comprising a housing, said housing being divided into two sections, fastening means for securing said sections together, said housing having a base, fastening means for removably attaching said base to the bulkhead, said housing having an externally screw-threaded projection, said housing having a cable receiving opening extending therethrough, said cable receiving opening including a frustoconical opening disposed substantially within said projection, a resilient compression gland mounted within said frustoconical opening, said compression gland being divided into two sections, the outer diameter of said compression gland being formed complementarily to said frustoconical opening, the inner diameter of said compression gland having a cable receiving opening, a nut adapted to be screw threadedly mounted on said projection, said nut being divided into two sections, fastening means for removably securing said sections together, said nut having a portion thereof overlying one end of said compression gland, said nut adapted to be tightened on said projection to compress said compression gland longitudinally within said frustoconical opening to reduce the inner diameter of said compression gland into engagement with the periphery of a cable extending through said cable receiving opening, all of the parts of said fitting being split substantially diametrically into two substantially equal and complementary sections, said base having a substantially flat portion adapted to abut against the bulkhead, and split sealing means having overlapped ends disposed between said flat portion of said base and the bulkhead.

2. The structure described in claim 1, said sealing means between said base and bulkhead comprising an annular recess extending around the entire periphery of said flat portion of said base, and a diametrically split seal mounted in said recess, said split seal comprising two complementarily formed semicircular sections, the opposite ends of each of said split seals having substantially half the thickness of the remainder thereof, said ends overlapping each other, each of said ends having a projection and a recess adapted to engage the projection of the other of said sections.

3. The structure described in claim 1, and a pair of substantially L-shaped recesses formed in the abutting faces of said housing sections, and a pair of complementarily formed resilient seal strips mounted in said recesses, one end of each of said seal strips making sealing engagement with the periphery of said compression gland and the other end thereof making sealing engagement with the sealing means disposed between said base and bulkhead.

4. The structure described in claim 3, and a compression ring disposed between said nut and said compression gland, said nut having an annular recess in which said compression ring is mounted, said ring being held within said recess when the sections of said nut are secured together, said ring having a thickness slightly less than the depth of said recess, whereby said nut is free to rotate without rotating said ring.

5. The structure described in claim 1, the sections of said compression gland having transversely directed abutting faces, and means integrally formed on said faces for interengagement and alignment of said sections with respect to each other.

6. The structure described in claim 5, said interengaging means comprising an outwardly projecting pin and a spaced inwardly directed recess formed on each of said abutting faces, said pins removably fitting into said recesses.

* * * * *